(12) United States Patent
Grandy (10) Patent No.: US 6,492,588 B1
(45) Date of Patent: *Dec. 10, 2002

(54) SELF SUPPRESSION WIRE OR CABLE, AND FERRITE BEAD IN COMBINATION

(75) Inventor: Mark E. Grandy, Port Huron, MI (US)

(73) Assignee: Prestolite Wire Corporation, Port Huron, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,673

(22) Filed: Nov. 3, 2000

Related U.S. Application Data (63) Continuation-in-part of application No. 09/383,046, filed on Aug. 25, 1999, now Pat. No. 6,362,418.
(60) Provisional application No. 60/098,189, filed on Aug. 26, 1998, now abandoned.

(51) Int. Cl.⁷ .................................................. H01B 11/06
(52) U.S. Cl. ................ 174/36; 174/120 R; 174/120 SC; 280/728.1
(58) Field of Search ................................. 174/36, 120 R, 174/120 SC; 333/12, 243, 175; 336/90, 174, 175, 98

(56) References Cited

U.S. PATENT DOCUMENTS

| | | |
|---|---|---|
| 4,347,487 A | 8/1982 | Martin |
| 4,424,403 A | 1/1984 | Bogese, II |
| 4,486,721 A | 12/1984 | Cornelius et al. |
| 5,053,583 A | 10/1991 | Miller et al. |
| 5,170,010 A | 12/1992 | Aldissi |
| 5,206,459 A | 4/1993 | Aldissi |
| 5,262,591 A | 11/1993 | Aldissi |
| 5,262,592 A | 11/1993 | Aldissi |
| 5,545,853 A | 8/1996 | Hildreth |
| 5,556,132 A | 9/1996 | Sampson |
| 5,756,928 A | 5/1998 | Ito et al. |
| 6,054,649 A | 4/2000 | Uchida et al. |
| 6,252,163 B1 * | 6/2001 | Fujimori et al. ............... 174/36 |
| 6,362,418 B1 * | 3/2002 | Grandy et al. .......... 174/120 R |

FOREIGN PATENT DOCUMENTS

JP         3-78984     *  4/1991

OTHER PUBLICATIONS the "C&M Corporation", 1992, p. 11.

* cited by examiner

Primary Examiner—Chau N. Nguyen
(74) Attorney, Agent, or Firm—Rader, Fishman & Grauer PLLC (57) ABSTRACT

A suppression wire combination includes a stranded copper conductor, a layer of ferrite-filled polymer extruded around the stranded copper conductor, and an insulation layer which is preferably annularly extruded around and directly over the ferrite-filled polymer, together making a suppression wire. A ferrite bead is connected in series or in the surroundings of the suppression wire.

17 Claims, 7 Drawing Sheets

SELF SUPPRESSION WIRE OR CABLE, AND FERRITE BEAD IN COMBINATION

This application is a continuation-in-part of co-pending U.S. Pat. No. 6,362,418, issued Mar. 26, 2002, the entire contents of which is hereby incorporated by reference, and which claims the benefit of U.S. Provisional patent application Ser. No. 60/098,189, filed on Aug. 26, 1998.

FIELD OF THE INVENTION

The present invention relates to conductive wire and a conductive wire connection apparatus for use in supplying an activation signal to a common airbag module that is employed to provide supplemental protection to automobile occupants. The present invention also relates to conductive suppression wires, and cables containing conductive suppression wires, and to suppression wire/cable combinations.

BACKGROUND OF THE INVENTION

The airbag inflator assembly art employs the use of pyrotechnic materials for the release of gas at high pressure, nearly simultaneously with vehicle impact during a collision to timely inflate an airbag. The filled airbag then protects the vehicle occupants from substantial harm by providing a cushion to absorb the energy of the momentum transfer. To achieve the timely filling of an airbag, the inflator assembly is designed to utilize a pulse of electrical energy to initiate the rapid combustion of pyrotechnic compounds within a detonator or squib to produce a high-pressure burst of combusting gasses. The intense temperature of these combusting gasses is sufficient to initiate the rapid deposition of a second reservoir of pyrotechnic pellets, which yields a large volume of gas sufficient to fully inflate the airbag. The detonator must be reliable while also capable of integration into the greater assembly unit, bearing in mind the desire for ease of manufacture.

For a detonator to be accepted by the automobile manufacturing industry for the purpose of airbag assembly, the electrical circuit of the detonator must be able to provide protection against inadvertent activation from undesirable interception of varying levels of radiated radio frequency energy (EMI). Thus, appropriate grounding and shielding and utilization of EMI suppression components within a detonator circuit are necessary to ensure that absorption of EMI energy does not inadvertently deploy the air bag. Prevention of inadvertent detonation due to the interception and absorption of EMI is exceedingly important to provide safe vehicle operation.

A connector electrically connects wires that convey an initiation signal, and transfers that signal to the detonator. Inductance is provided in existing systems by positioning separate lumped ferrite blocks or beads within the actual connectors. Some ferrite beads that are commonly used occupy significant space within the connectors that contain them, thus causing the connectors to be larger than airbag designers would prefer. Moreover, the connectors are complex, increasing size and manufacturing expense, while arguably reducing overall reliability. There is great pressure from vehicle manufacturers to reduce the size and manufacturing expense of these connectors while improving performance and reliability.

The utilization of inductance to limit the emission and absorption of EMI radiation is also desirable for combinations of multiple suppression wires, and for wire cables that carry a plurality of signals. The need for suppression of EMI radiation and absorption (RFI) is particularly present in cables that carry both electrical power as well as data signals. For example, cables that carry electric power and data signals to a remote sensor have employed the use of some type of metallic braid or shield within the outer cable jacket to enhance suppression of either internally or externally generated RFI. Other cables have additional insulating material packed around and between the conductive wiring that shields EMI radiation. Addition of these components requires additional cost and production time and adds unwanted complexity to the cable construction. It is therefore desirable to provide a suppression wire combination, as well as a suppression cable, where each does not require the addition of extra suppression materials acting as shields or insulating fillers.

SUMMARY OF THE INVENTION

A suppression wire combination according to the present invention includes a stranded copper conductor, a layer of ferrite-filled polymer extruded around the stranded copper conductor, and an insulation layer that is preferably annularly extruded around and directly over the ferrite-filled polymer. A ferrite bead is connected in series or in the surroundings of the suppression wire. The ferrite bead can be housed in an electrical connection harness, disposed on an electric circuit board, utilized as a wound rod choke, or placed around the entire circumference of at least a portion of the suppression wire. One end of the self-suppression pair of wires can be connected to an ignition signal generator, and the other end of the pair can be connected to a detonator, the detonation of which results in rapid airbag inflation.

The stranded copper conductor is gauge sized ranging between sixteen and twenty-eight gauge in a preferred embodiment of the invention. Furthermore, the polymer that has ferrite dispersed therein may be selected from such polymers as polyvinyl chloride, cross-link polyethylene, a polytetrafluoroethylene (PTFE) polymer such as Teflon®, silicone, an ethylene propylene diene polymer, fluorinated ethylene propylene terpolymer rubber, and a polyvinylidene (PVDF) polymer such as Kynar®. One could also utilize various formulations of ferrite. The ferrite is disposed within the polymer in the form of a fine powder with an average particle size typically between one micrometer and two hundred micrometers. The chemical composition of the ferrite determines the degree of suppression effect (impedance) imparted to the conductor overlaid with a ferrite-filled polymer and also the frequency range over which the impedance is preferentially imposed on the conductor. For example, ferrites belonging to the manganese zinc class preferentially impose inductance and suppression at low frequencies (less than 30 megahertz). Also, nickel zinc type ferrites impart enhanced impedance at higher frequencies (25 through 200 megahertz). These ferrite compound families can be compounded with any of the above polymers to achieve the preferential enhanced suppression impedance at frequency ranges requiring enhanced suppression.

The present invention also involves a method of manufacturing an ignition signal system, which includes the steps of providing the above-described suppression wire, connecting one end of the suppression wire to an ignition signal generator, and connecting the other end of to a detonator, the detonation of which results in vehicle airbag inflation.

In a second embodiment of the invention, a suppression wire cable for operation of an electronic device according to the present invention includes a plurality of suppression wires, each of which includes a stranded copper conductor.

A layer of ferrite-filled polymer is preferably extruded around and directly on each stranded copper conductor. An insulation layer is preferably extruded around and directly on the ferrite-filled polymer. A protection jacket that comprises a polymer material is provided as an outer layer. The plurality of suppression wires are preferably in a twisting formation, and the outer protection jacket serves to maintain the formation.

Because there are a plurality of suppression wires in the cable of the present invention, both data signals and electrical power can be channeled through the cable. Also, the ferrite-filled polymer and the outer protection jacket each include a polymer selected from polyvinyl chloride, cross-linked polyethylene, a PTFE polymer, silicone, an ethylene propylene diene polymer, fluorinated ethylene propylene terpolymer rubber, and a PVDF polymer.

A method of manufacturing a suppression wire cable according to the present invention includes the steps of providing a plurality of the above described suppression wires, preferably forming the suppression wires in a twisting formation, and surrounding the suppression wires with the above-described outer protection jacket.

A third embodiment of the present invention also includes a suppression wire combination, which includes a) a first suppression wire, including a first stranded copper conductor, a first layer of ferrite-filled polymer, extruded around the first stranded copper conductor, and a first insulation layer, extruded around the first ferrite-filled polymer; b) a second suppression wire, identical in its construction as the first suppression wire, and c) a connecting rib, connecting the first and second insulation layers. The first insulation layer, second insulation layer, and connecting rib are integrally molded.

According to the third embodiment of the invention, additional suppression wires, each being identical to the first and second suppression wires, are provided so that the insulation layers, and connecting ribs separating them are all integrally molded, and all of the suppression wires are disposed in a flat row.

DETAILED DESCRIPTION OF THE PREFERRED EMBODIMENT

The present invention is based on the quantification of the amount of impedance provided by the existing compliant suppression components in airbag systems that gives rise to the requisite EMI suppression property, and equaling that impedance level with smaller, inexpensive and less complicated components. It has been found for example, that the equivalent impedance of existing suppression components can be provided by extruding a thin belt of a ferrite-filled polymer compound around the actual copper conductor of standard 20 and 22 gauge wire. More particularly, less than ten inches of such a wire will provide as much impedance as the ferrite beads that are being employed in contemporary connector designs.

Figure 1:
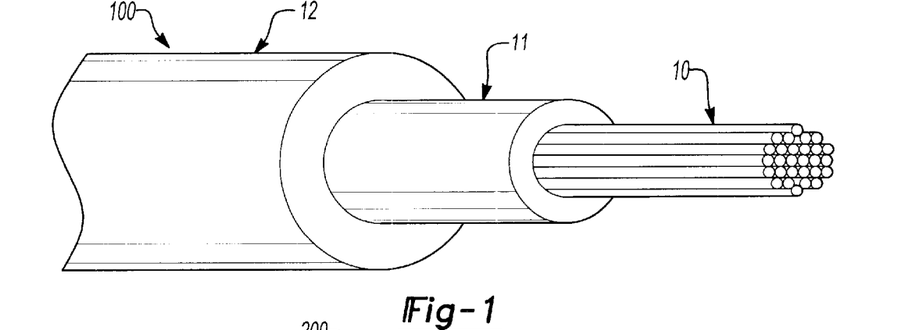
FIG. 1 shows a sectional view of a first embodiment of suppression wire according to the present invention.
Figure 3:
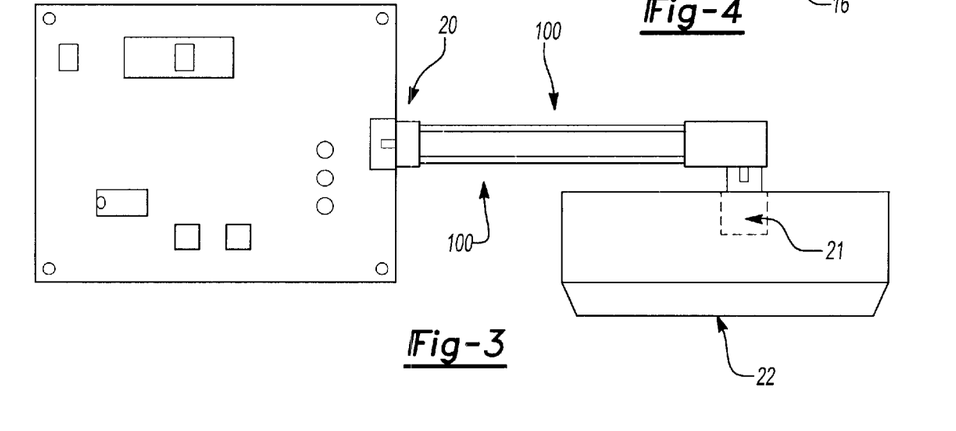
FIG. 3 shows a perspective view of the suppression wire of the first embodiment when connected to an airbag detonator according to the present invention.

A first embodiment of a suppression wire 100 according to the present invention is shown in FIGS. 1 and 3, with FIG. 3 showing the suppression wire 100 when connected to an airbag detonator 21. The suppression wire 100 includes a stranded copper conductor 10, surrounded by a layer of ferrite-filled polymer 11 that is extruded around the stranded copper conductor 10. An insulation layer 12 is formed around and directly over the ferrite-filled polymer 11. Preferably, the insulation layer 12 is annularly extruded over the ferrite-filled polymer 11.

As shown in FIG. 3, one end of the self-suppression wire 100 is connected to an ignition signal generator 20. Two wires 100 are preferably used to ensure the detonation of the airbag when signaled by the signal generator 20. The end of the suppression wire 100 opposite the end that is attached to the signal generator 20 is connected to a detonator 21. When the signal is carried from the signal generator 20 to the detonator or squib 21, near simultaneous airbag inflation protects vehicle occupants during a collision.

The stranded copper conductor 10 is either a 20 gauge conductor, or a 22 gauge conductor in a preferred embodiment of the invention, as these sizes have been adopted as the standard for airbag wiring in the industry. Furthermore, the polymer layer 11 that has ferrite dispersed therein is preferably selected from, though not limited to such polymers as polyvinyl chloride, cross-link polyethylene, a PTFE polymer, silicone, an ethylene propylene diene polymer, fluorinated ethylene propylene terpolymer rubber, and a PVDF polymer, and ferrite is selected from a chemical class conducive to imparting maximum impedance but with a frequency range requiring enhanced suppression.

Figures 2, 4:
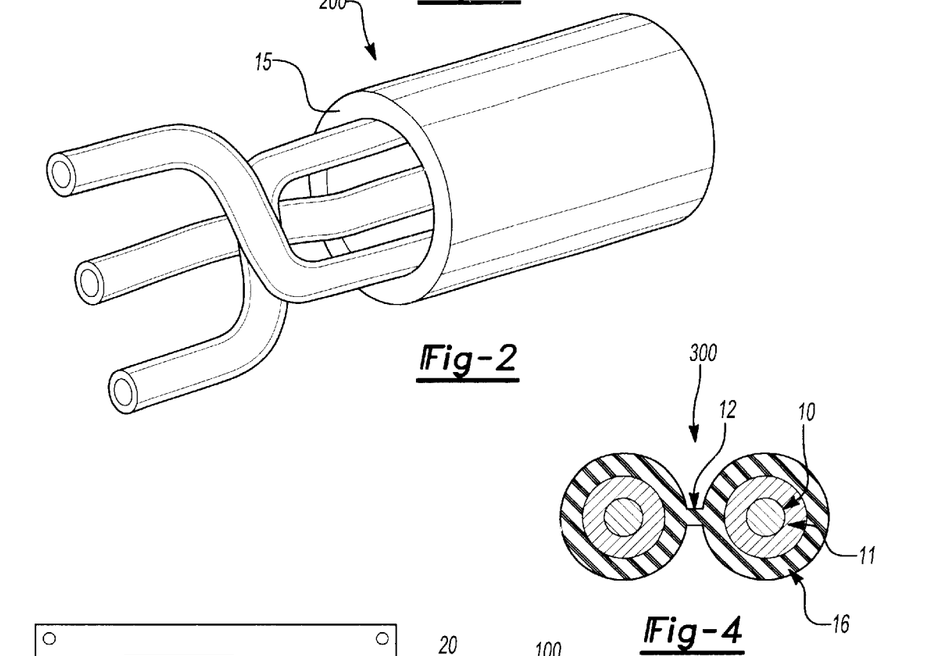
FIG. 2 shows a sectional view of a second embodiment of suppression wire cable according to the present invention.
FIG. 4 shows a cross-sectional view of a suppression wire combination according to the present invention.

According to a second embodiment of the invention, the above-described self-suppression wire 100 can be used in a cable, and optionally in conjunction with conventional non-self-suppression wiring. More particularly, a cable 200 shown in FIG. 2 can be made and used that includes a plurality of suppression wires 100. Each of the suppression wires 100 includes a stranded copper conductor 10, a layer of ferrite-filled polymer 11, and an insulation layer 12 as described above and as shown in FIG. 1. The cable 200 of the present invention also includes an outer protection jacket 15 preferably made of a polymer material. As shown in FIG. 2, the plurality of suppression wires 100 are preferably in a twisting formation, and the outer protection jacket 15 serves to maintain the twisting formation as well as to provide protection for the individual suppression cables 100 from external mechanical and chemical effects which could damage the grouping of the suppressor wires 100.

Because there is a plurality of suppression wires 100 in the cable 200 of the present invention, both data signals and electrical power can be channeled through the cable. Typically, the number of individual suppressor wires to be grouped in a cable according to the disclosed embodiment may be between two and twenty-five. Standard sized conductors 10 can be used, i.e., 20 gauge or 22 gauge conductors.

An example of the use of the cable of the present invention is a case where a remote sensor senses both electrical power and data signals from an interrogating electronic device. The grouping of the suppression wires 100 provides the electrical pathway for the power and data signals. The RFI suppression feature of the suppressor wire 100 provides a reduction of the deleterious effects of RFI from an external source. The suppression feature also reduces the RFI emissions that might be developed internally in terms of the sensor and interrogating electronics combination.

Also, the ferrite-filled polymer and the outer protection jacket 15 each can be, though not limited to being, any of the common wire and cable insulation polymers such as polyvinyl chloride, cross-link polyethylene, a PTFE polymer, silicone, an ethylene propylene diene polymer, fluorinated ethylene propylene terpolymer rubber, and a PVDF polymer.

In a third embodiment of the invention, as shown in FIG. 4, two self-suppression conductors 10 are each surrounded by a ferrite-containing polymer 11 as manufactured and set forth above, and as shown in FIG. 1. The two self-suppression conductors 10 with the ferrite-containing polymer surrounding layers 11 are contained within one outer jacket 16. Combinations 300 of self-suppression wires sharing one outer jacket 16 have tremendous utility as wiring for various electronics such as speaker wiring, wiring for household appliances, etc.

A small connecting rib 17 bridges the combined suppression conductors 100 with each other. This continuous rib 17 is formed as part of an extrusion operation that disposes the outer jacket 16 over the ferrite-filled polymer 11.

While FIG. 4 depicts two suppression wires being disposed within an outer jacket 16 and connected to each other by a bridging rib 17, it is within the principles of the present embodiment to expand the concept of suppression wire combinations to constructions in which more than two self suppression wires (copper with the ferrite/polymer layer) are disposed within a single outer polymer jacket. The multiple wires would be arranged in a flat row, similar to a flat ribbon cable, with each wire connected to its neighbor conductor via a thin rib 17, as in the two-conductor version.

The third embodiment of the invention provides the advantage of a more compact and easier constructed harness assembly in which two or more self-suppression wires are required. Two or more self-suppression conductors would be neater in appearance if they are retained with each other, rather than being loose.

Furthermore, each wire of the combination can be easily separated from the remaining conductors by ripping the conductors apart-effectively shearing the connecting rib for whatever length is required. Such a separating operation would be implemented for example, to prepare the cable end for installing a connector.

Figures 6A, 6B:
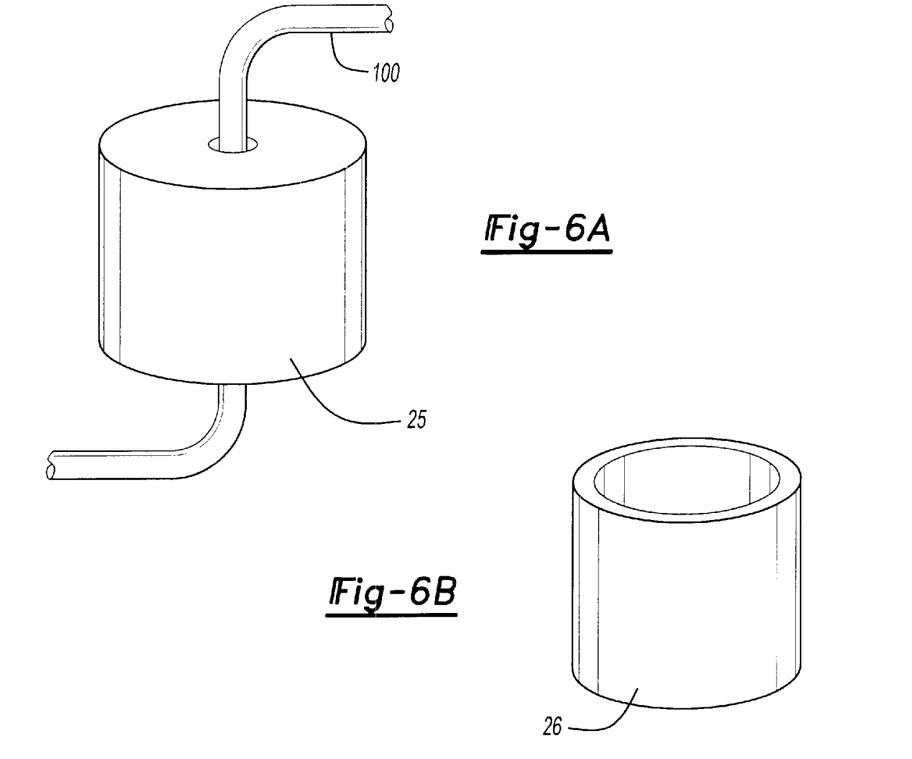
FIG. 6a shows a cylinder-shaped ferrite bead that can be used in conjunction with a suppression wire according to the present invention.
FIG. 6b shows a similar oval shaped ferrite bead.
Figure 6C:
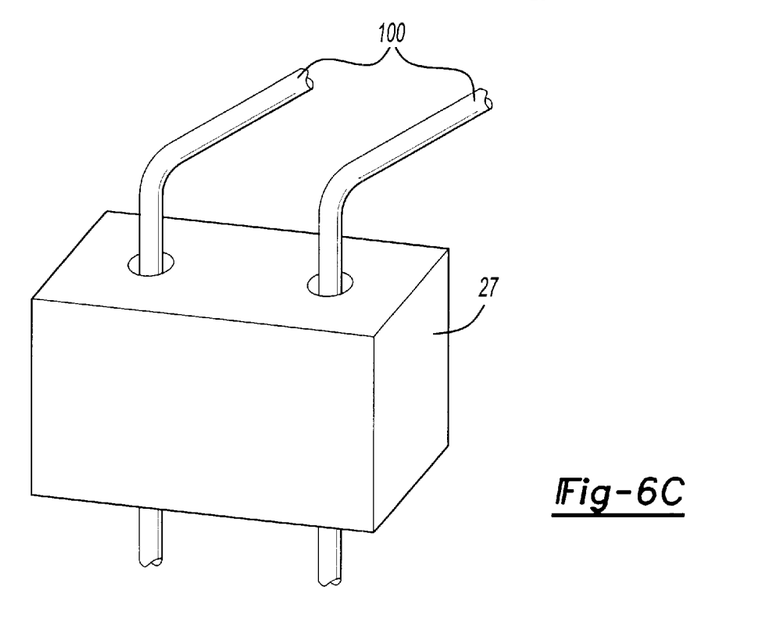
FIG. 6c shows a two-holed ferrite bead.

A fourth embodiment of the invention involves a self-suppression wire 100, a cable 200, or a harness of a plurality of wires in combination 300, in combination with a ferrite bead. Examples of ferrite beads that can be used with a suppression wire are shown in FIGS. 6a to 6c. The beads 25, 26, 27 are shown only as examples, and can be formed to have a variety of shapes, or combined with other ferrite beads to provide suppression in the vicinity of the wire 100, cable, or a harness of a wires 300. The combination can be implemented as described above to suppress RFI in the environment of a connector through which an initiation signal can be carried to a detonator for an airbag. Moreover, the combination can be implemented to suppress RFI in a variety of electrical circuits other than those used to detonate airbags. It is within the scope of the invention to use the suppression wire and the ferrite bead/suppression wire combination in virtually any type of electrical circuitry.

Figure 7:
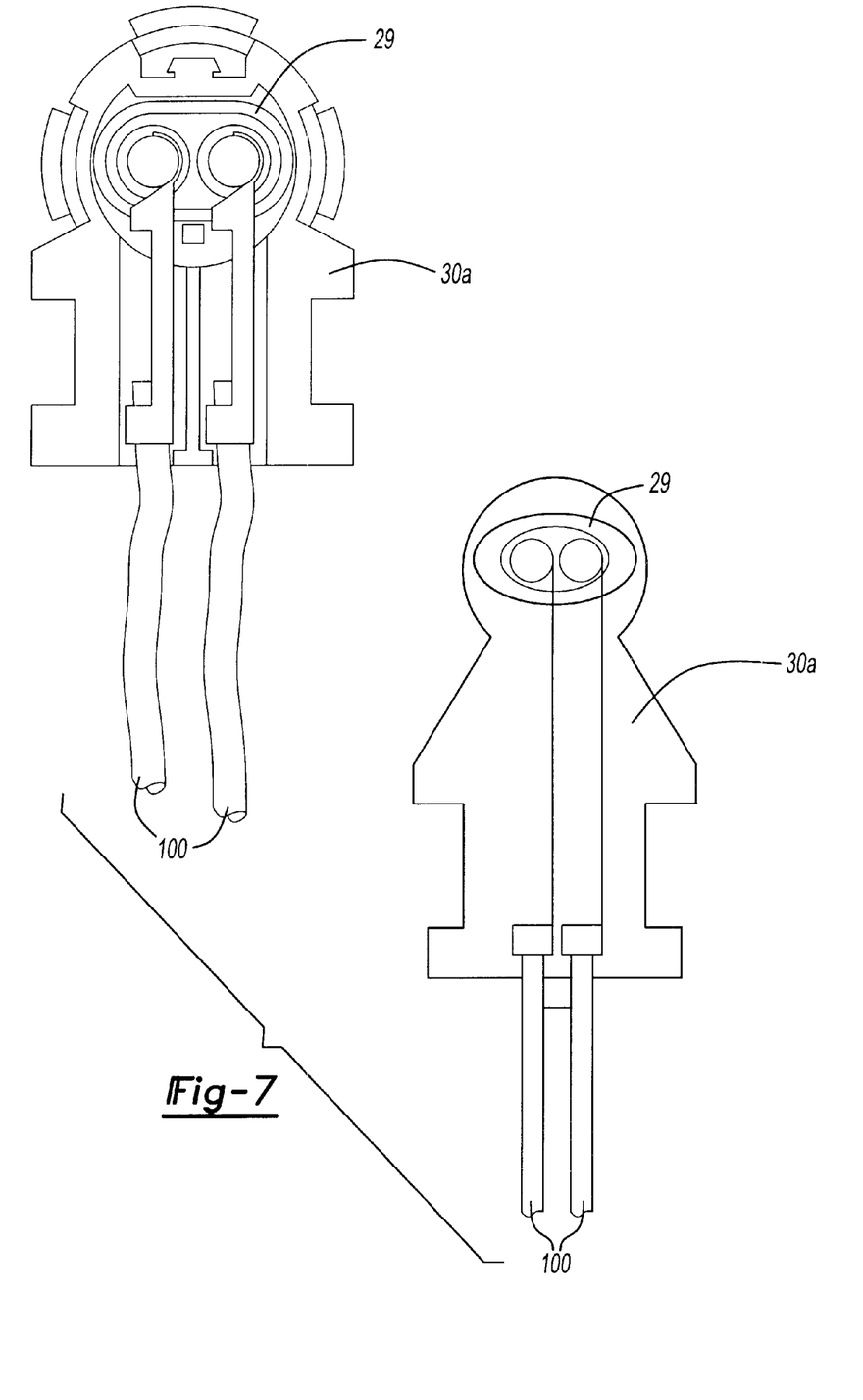
FIG. 7 shows the suppression wire of the present invention in series with a ferrite bead disposed around electrical terminals within an electrical harness connector.
Figure 8:
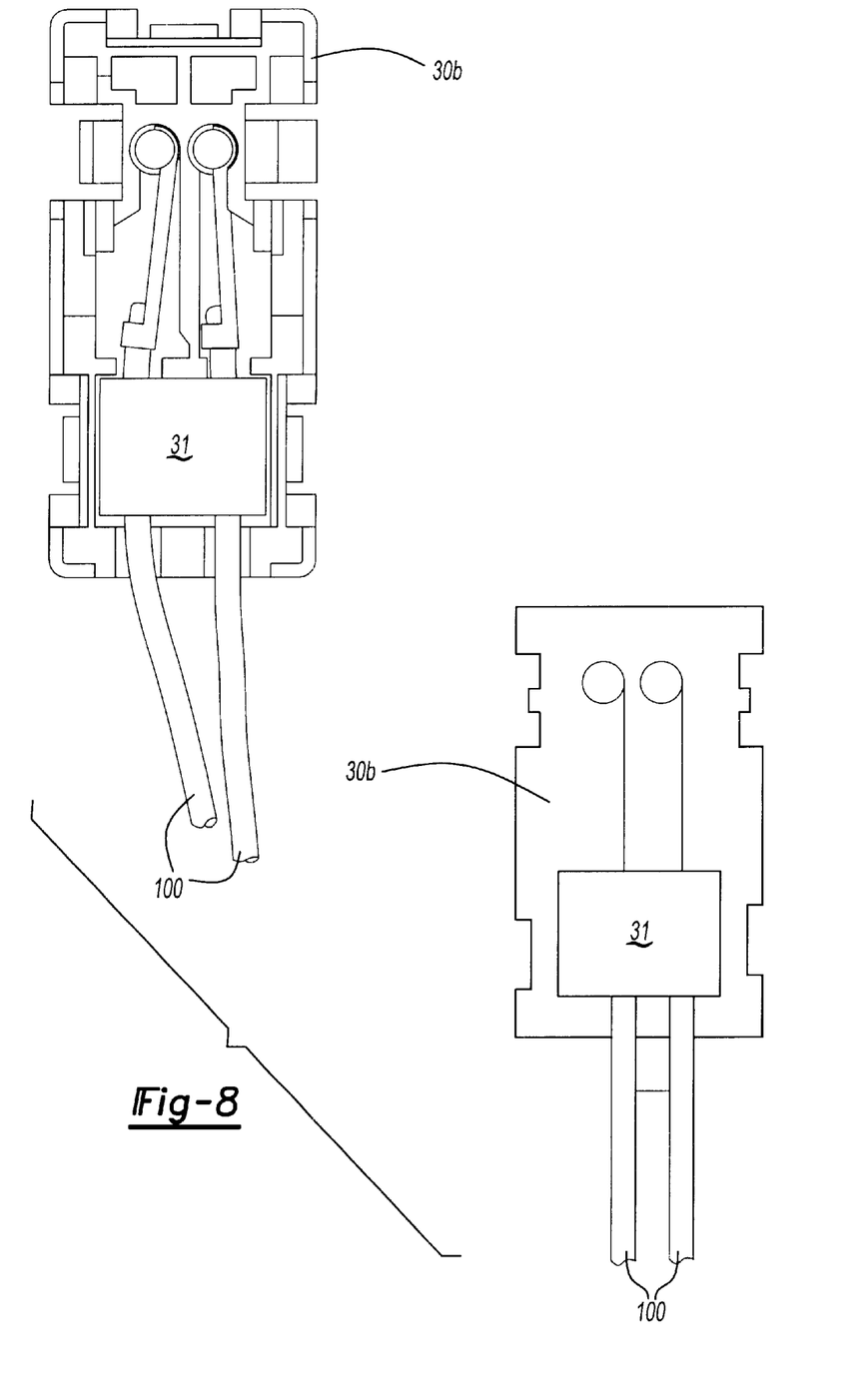
FIG. 8 shows the suppression wire of the present invention with a ferrite bead surrounding the wire within an electrical harness connector.
Figure 9:
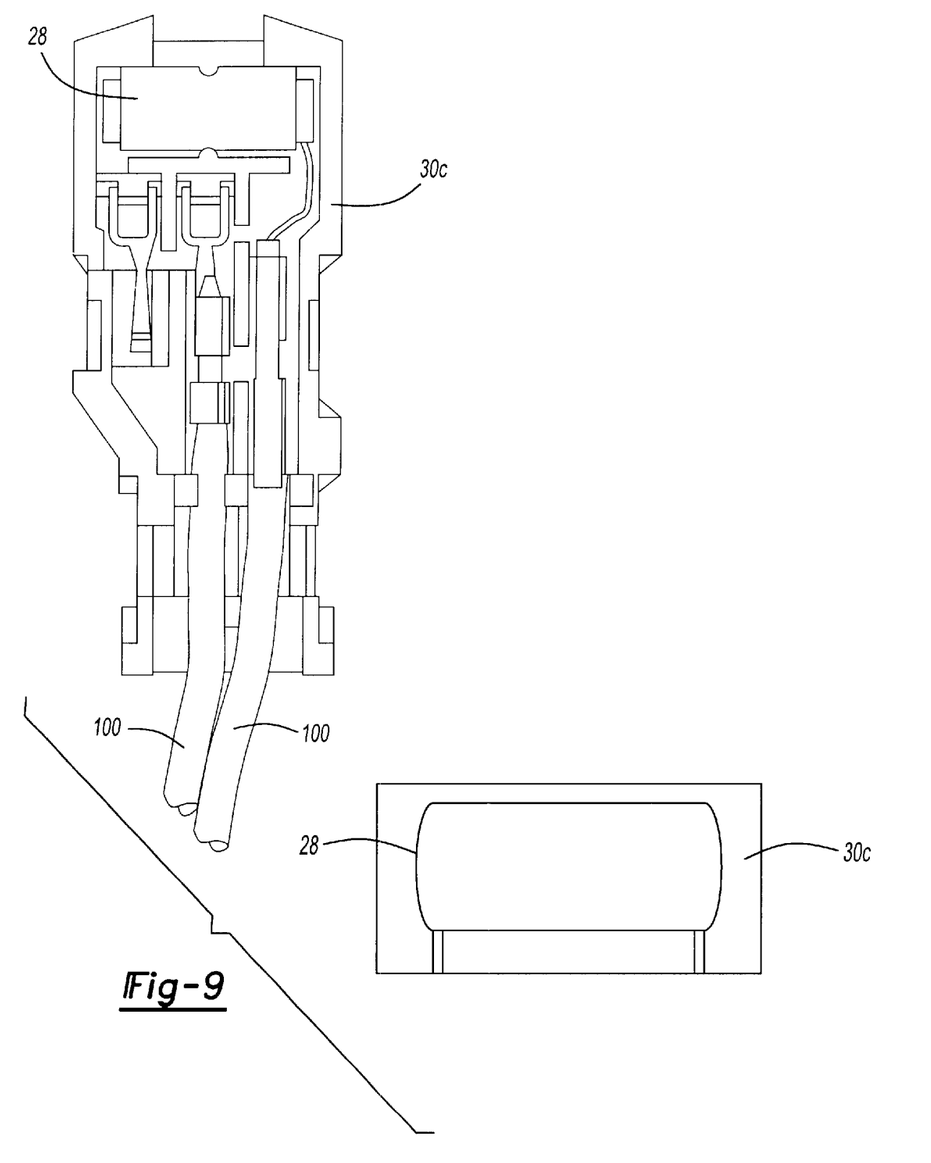
FIG. 9 shows the suppression wire of the present invention in series with a ferrite bead that serves as a wound rod choke.
Figure 10:
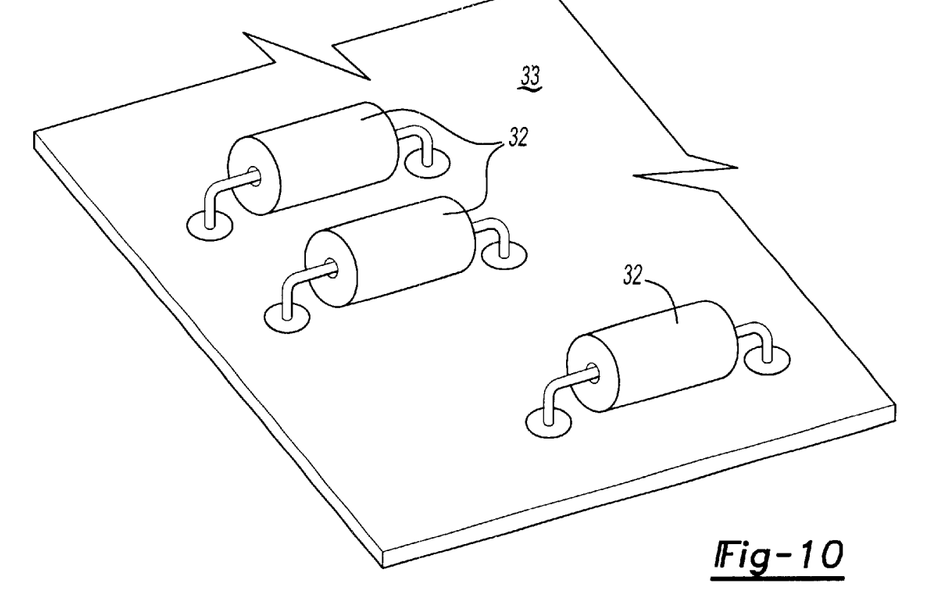
FIG. 10 shows a ferrite bead attached to a circuit board in series with a harness or connector and a suppression wire according to the present invention.

FIG. 7 shows a suppression wire 100 in series with the ferrite bead 29, similar to the bead 26 shown in FIG. 6b, disposed around electrical terminals within an electrical harness connector 30a. FIG. 8 shows a pair of suppression wires 100 of the present invention with a ferrite bead 31 surrounding each wire 100 within an electrical harness connector 30b. The ferrite bead 31 is similar to the bead 27 shown in FIG. 6c. FIG. 9 shows the suppression wire 100 of the present invention in series with a ferrite bead 28 that serves as a wound rod choke. The bead 28 is disposed inside a harness connector 30c. FIG. 10 shows a plurality of ferrite beads 32 attached to a circuit board 33 in series with a harness or connector and a suppression wire (not shown). The use of both the ferrite bead and the suppression wire 100 offers greater overall RF suppression over a greater frequency range than either individual component.

In most cases, the ferrite-filled polymer included in the suppression wire 100 of the present invention provides significant series impedance at frequencies at least around and above 50 MHz, and the ferrite beads provide significant series impedance at frequencies at least around and below 50 MHz. The combination in series provides significant impedance over frequency ranges beginning with the lowest frequency covered by the ferrite bead, and extending well beyond 100 MHz. An RF impedance analyzer was used to measure impedance at various frequencies.

Figure 5:
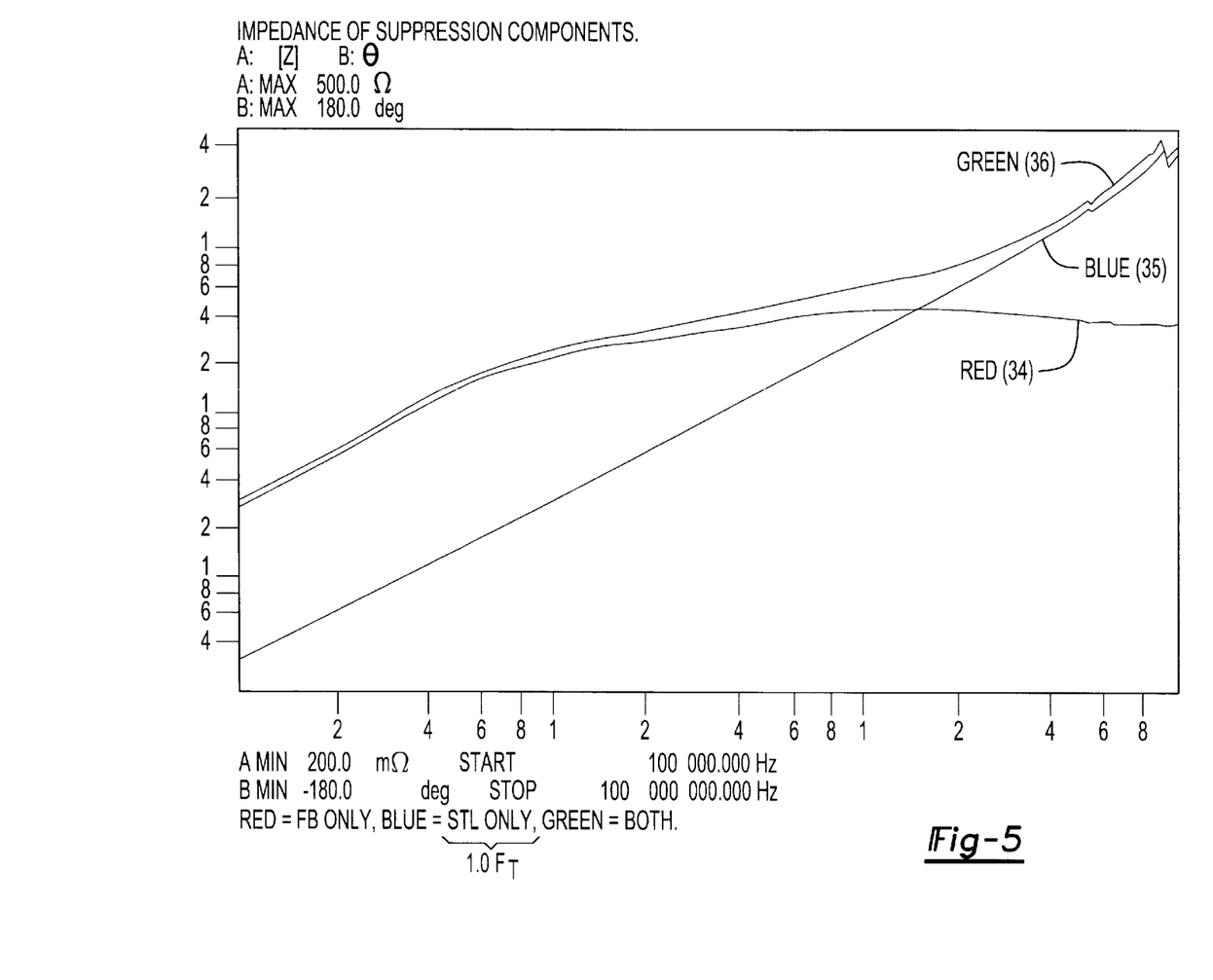
FIG. 5 shows a graphical representation of impedance suppression of the wiring combination of the present invention, compared to the impedance suppression of a simple ferrite bead.

Using the analyzer, it was confirmed that the combination of a ferrite bead with the suppression wire 100 surprisingly provides more series impedance than either component individually. The results of the analysis are shown in the graph of FIG. 5. Trace 34 in the graph represents the impedance spectrum of a simple ferrite bead. Trace 35 represents the impedance spectrum of about one foot of the suppression wire 100 of the present invention. Finally, trace 36 represents the impedance spectrum of the series combination of the one-foot suppression wire 100 of the present invention and the ferrite bead. The impedance was measured for each of these suppression components over a frequency range between 100 kHz and 100 MHz. As shown by traces 34 and 35, the ferrite bead provided greater impendence than the one-foot suppression wire 100 between 100 kHz and about 15 MHz. Above about 15 MHz, the suppression wire 100 provided superior impedance than the ferrite bead. Surprisingly, through the entire frequency range, the combination of the two suppression components provided greater impedance than either component alone, as shown by trace 36.

Having described preferred embodiment of the invention, it is to be understood that the invention is not limited to any of the precise embodiments described herein. One skilled in the art could provide various changes and modifications without departing from the spirit or scope of the invention as defined in the appended claims.

What is claimed is:

1. A detonation circuit of an airbag system, which comprises a suppression wire combination, comprising:

a stranded copper conductor;

a layer of ferrite-filled polymer, extruded around said stranded copper conductor;

an insulation layer, extruded around said ferrite-filled polymer, resulting in said copper conductor, ferrite-filled polymer, and insulation layer together forming said suppression wire; and a ferrite bead, used in association with said suppression wire to provide further suppression, wherein a first end of said self suppression wire is connected to a detonator, the detonation of which results in airbag inflation.

2. A detonation circuit according to claim 1, wherein said ferrite-filled polymer is annularly extruded directly over said stranded copper conductor.

3. The detonation circuit according to claim 1, wherein said ferrite-filled polymer comprises a polymer selected from polyvinyl chloride, cross-link polyethylene, a PTFE polymer, silicone, an ethylene propylene diene polymer, fluorinated ethylene propylene terpolymer rubber, and a PVDF polymer.

4. The detonation circuit according to claim 1, wherein said ferrite is disposed within said polymer in the form of a fine powder with an average particle size between one micrometer and two hundred micrometers.

5. The detonation circuit according to claim 1, wherein ferrite in at least one of said ferrite-filled polymer and said ferrite bead comprises manganese and zinc.

6. The detonation circuit according to claim 1, wherein ferrite in at least one of said ferrite-filled polymer and said ferrite bead comprises nickel and zinc.

7. The detonation circuit according to claim 1, wherein said ferrite bead is connected in series with said suppression wire.

8. The detonation circuit according to claim 1, wherein said ferrite bead surrounds at least a portion of said suppression wire.

9. The detonation circuit according to claim 1, wherein said ferrite bead is mounted in an electrical connection harness.

10. The detonation circuit according to claim 1, wherein said ferrite bead is mounted on an electric circuit board.

11. The detonation circuit according to claim 1, wherein a portion of said conductor extends from said suppression wire, and is wrapped around said ferrite bead.

12. A detonation circuit for an airbag system, which comprises a suppression wire cable, which comprises:

a plurality of suppression wires, each of which comprises a stranded copper conductor, a layer of ferrite filled polymer extruded around said stranded copper conductor, and an insulation layer, extruded around said ferrite filled polymer;

an outer protection jacket that includes a polymer material, wherein a first end of said suppression wire cable is connected to a detonator, the detonation of which results in airbag inflation.

13. The detonation circuit according to claim 12, wherein said plurality of suppression wires are in a helically twisting formation, and said outer protection jacket maintains said helically twisting formation.

14. The detonation circuit according to claim 12, wherein both data signals and electrical power are channeled through said plurality of suppression wires.

15. The detonation circuit according to claim 12, wherein said ferrite filled polymer and said outer protection jacket each comprise a polymer selected from polyvinyl chloride, cross-link polyethylene, a PTFE polymer, silicone, an ethylene propylene diene polymer, fluorinated ethylene propylene terpolymer rubber, and a PVDF polymer.

16. The detonation circuit according to claim 12, wherein said ferrite filled polymer is annularly extruded directly over each of said stranded copper conductors.

17. The detonation circuit according to claim 12, wherein said suppression wires are combined with non-suppression wires within said outer protection jacket.

* * * * *